March 10, 1970 V. R. CLARKE 3,500,030
ELECTRIC ANALOGUE CALCULATOR FOR THE DETERMINATION OF
CAPITAL INVESTMENT PROFITABILITY
Filed Oct. 11, 1965
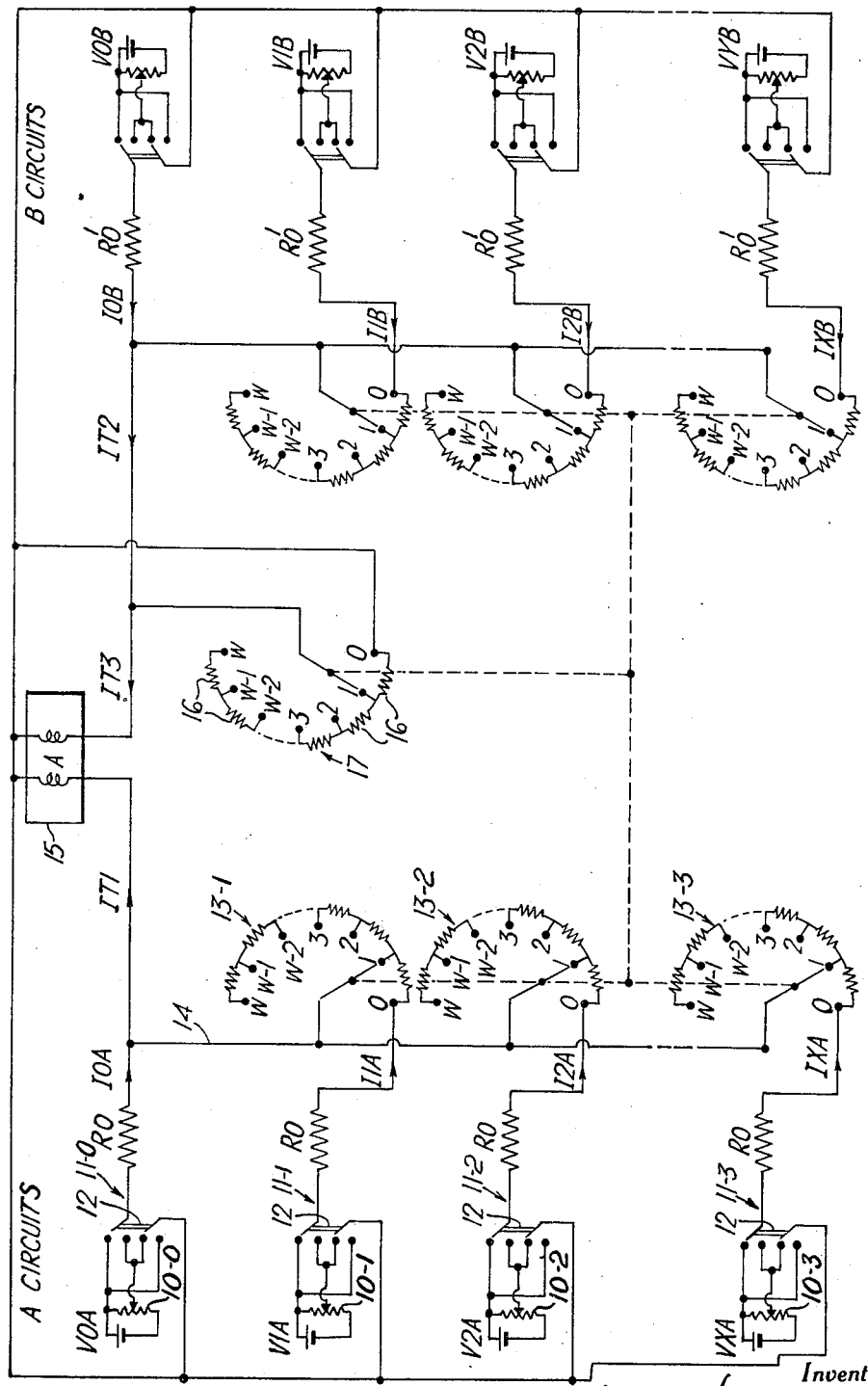
Inventor
Vaughan Richard Clarke
By Dowell Howell
Attorneys United States Patent Office 3,500,030
Patented Mar. 10, 1970

3,500,030
ELECTRIC ANALOGUE CALCULATOR FOR THE DETERMINATION OF CAPITAL INVESTMENT PROFITABILITY
Vaughan Richard Clarke, Newport Pagnell, England, assignor to National Research Development Corporation, London, England, a British corporation
Filed Oct. 11, 1965, Ser. No. 494,361
Claims priority, application Great Britain, Oct. 12, 1964, 41,600/64
Int. Cl. G06g 7/48, 7/16
U.S. Cl. 235—184          7 Claims

ABSTRACT OF THE DISCLOSURE

The invention provides an electric analogue calculator for solving the accounting problem of calculating the average rate of compound interest that a capital investment may be expected to earn, after the yearly cash flows have been estimated. A plurality of circuit branches represent consecutive future years and each can be fed with an analogue voltage adjustable to represent the cash flow in the respective year. Each circuit branch includes a potentiometer of the rotary stepping type with its resistance chosen so as to introduce into the circuit selected factors of present worth based on different rates of compound interest that the investment may earn. All these potentiometers are ganged together so that a single control adjusts each circuit branch for the same interest rate at the same time. All circuit branches feed a common summing circuit, and by adjusting the potentiometers until condition of zero current is achieved in the summing circuit the desired forecast of compound interest rate that will be earned by the investment is achieved.

DESCRIPTION OF INVENTION

This invention relates to electric analogue calculators for solving discounted cash flow and other problems involving compound interest factors.

In calculating the profitability of capital investment projects the accounting method that is now recognized as producing the best answer is known as discounted cash flow. This method involves the performance of three steps, which are:

(a) Forecasting the effect of the investment in terms of cash flow (before taxation), whether outward or inward, during each year of the life of the project;

(b) Calculating the effects of taxation and governmental grants and allowances to arrive at the net cash flow;

(c) Calculating from the pattern of these results the average rate of compound interest that the investment will earn.

Up till now the only way of performing step (b) has been by calculating the effect on taxation of each transaction, and the only way of performing step (c) has been by trial-and-error calculations. It is an object of the invention to provide an electric analogue calculator which will perform step (c) after steps (a) and (b) have already been performed by human intelligence. It is a further object to provide a calculator which will perform both of steps (b) and (c), after step (a) has been performed by human intelligence.

For clarity of explanation it will first be assumed that step (b) is calculated without the aid of this invention, and that the annual net cash flow figures are presented to the calculator to work out step (c) only. Later the enlargement of the calculator for carrying out steps (b) and (c) simultaneously will be discussed.

The trial and error method employed hitherto for performing step (c) has been as follows. A rate of compound interest is chosen and factors of present worth corresponding to that interest rate are employed to calculate the present worth of the net cash inflow or outflow expected in each year of the period under consideration. The factors of present worth are multiplication factors which are obtainable from tables available to accounting clerks. Then the present worth inflows are added to obtain a figure for the total of the present worths of the inflows, and likewise the total of the present worths of the outflows is obtained, and the two totals are compared. It is necessary for substantial parity to exist between these totals, and so the calculations are reworked with different percentage rates of compound interest until this result is achieved. The percentage rate that gives this result is the rate of return on the investment.

Since the trial and error calculations constitute a long and irksome task it is the aim of this invention to present an easier way of obtaining the desired result.

According to the present invention, there is provided an electric analogue calculator comprising a plurality of similar circuits each representing a different future year (or month or the like), and each including means whereby an electrical signal input individual to that circuit can be given an accurately weighted value so as to constitute an analogue of net cash inflow or outflow in respect of that year, with the polarity of phase of the signal representing an inflow being opposite to that for an out-flow, individual adjustable impedance means associated with each circuit for modifying the analogue signal therein in accordance with a factor of present worth corresponding to a selected rate of interest and appropriate to the particular year which the circuit represents thereby to obtain at the circuit output an analogue signal representing the present worth of the net cash inflow or outflow in respect of that year, and a common circuit for summing all the analogue output signals so obtained, each of the signal modifying means having various settings corresponding to different percentage rates of compound interest and all said modifying means being ganged together so that the same interest rate is simultaneously set in for each of the "year" circuits.

With such an arrangement the difference between the total present worth of net cash inflow and the total present worth of net cash outflow is automatically obtained in the summing circuit and therefore to perform the calculation for rate of return on the investment it is only necessary to adjust the setting of the ganged signal-modifying means until an interest rate is found at which the signal in the summing circuit is substantially zero; this can be done manually or alternatively there could be servo means for performing automatic adjustment until a signal null is achieved.

One way of carrying the invention into effect will now be described by way of example, reference being had to the accompanying drawing.

The drawing is a simplified circuit diagram of the calculator to be described. It will be seen that D.C. circuitry is employed comprising a number, say for example ten, similar parallel circuit branches 11–0, 11–1, 11–2 etc. each having an independent source of applied voltage $V_{0A}$, $V_{1A}$, $V_{2A}$ etc., a polarity reversing switch 12, and a resistor $R_0$ of the same ohmic value in each branch. In addition each branch, except the first, includes a rotary or stepping potentiometer 13–1, 13–2, 13–3 etc. which serves to introduce a selected amount of further resistance into the respective branch in series with the resistor $R_0$, all the potentiometers 13–1 etc. being ganged so that their wiper arms are moved as one by a common control knob (not shown) and are all therefore always at corresponding positions around their arc of travel. The parallel circuit branches 11-0, 11-1 etc. are connected to a common conductor line 14 in which is a centre-zero current indicating instrument 15. The individual currents in the branches 11-0, 11-1 etc. are algebraically summed in the common line each being either added or subtracted according to polarity as determined by the respective switch 12, and the instrument 15 shows the result of this summation.

Each source of applied voltage $V_{0A}$, $V_{1A}$, $V_{2A}$ etc. has connected across it a respective potentiometer winding 10-0, 10-1, 10-2 etc. the movable tap of which is connected in common to a middle pair of contacts of the respective switch 12 which middle contacts are therefore of one polarity. An outer pair of switch contacts is connected in common to the upper end of the potentiometer winding, as seen in the drawing, and therefore these outer contacts are of the opposite polarity. The proportion of the source voltage which is applied to the circuit branch including the respective resistor $R_0$ and, in the case of the circuit branches other than the first, the respective stepping potentiometer 13-1, 12-2 etc., is determined by the position of the tap along the source potentiometer 10-0, 10-1 etc.

The succeeding circuit branches 11-0, 11-1 etc. represent succeeding years of a project, the applied proportions of the voltages $V_{0A}$, $V_{1A}$, $V_{2A}$ etc. represent the net cash inflows and outflows appertaining to the various years and the rotary potentiometers 13-1 etc. introduce resistances for multiplying each such cash value by an appropriate factor of present worth, for a selected interest rate, so as to obtain the present worth values, each setting of the potentiometers 13-1 etc. representing a different percentage rate of interest. The first circuit branch, to which a proportion of $V_{0A}$ is applied, represents the year nought, that is to say the initial cash flow taking place at the commencement of the project for which the present worth factor is always unity and therefore no rotary switch 13 is needed for this branch. In a circuit branch an analogue signal current flows, which is, of course, proportional to the applied voltage and inversely proportional to the total resistance in the branch.

The resistors connected between the contacts of the rotary potentiometers 13-1 etc. are weighted resistors having different ohmic values in each switch. It will be understood that connecting one or more resistors into circuit within a branch 11-1, 11-2 etc. by operation of the respective potentiometers 13-1, 13-2 etc. causes the current signal in the branch to be reduced or factorised by an amount determined by the ohmic value of the added resistance in relation to the value of the fixed resistance $R_0$. Now if, for example, we consider a compound interest rate of 10%, a cash sum increases as a result of accrued interest by a factor of 1.1 in one year, 1.21 in two years, 1.331 in three years, and so on. The factors needed to work back from a cash sum in so many years time to present worth are, of course, the reciprocals of these. Thus for a "10% interest rate" setting of the potentiometer control knob the potentiometer 13-1 will introduce into the circuit branch 11-1 a resistance having its ohmic value chosen so as to attenuate the signal in the branch 11-1 by a factor equal to the reciprocal of 1.1, the potentiometer 13-2 will introduce into the circuit branch 11-2 a resistance having its ohmic value chosen to attenuate the signal in the branch 11-2 by a factor equal to the reciprocal of 1.21, and so on. Bearing in mind that the present worth factors for different years in respect of each rate of interest are avaliable in tables used by accounting clerks, one skilled in the art will have no difficulty in selecting a set of different resistors for connection to the circuit branches representing the various years which will have the effect of factorising the individual analogue currents in the circuit branches by the quantities necessary to reduce each cash sum represented to present worth, taking into account the number of years of accruing interest that each circuit branch has to represent. Adjustment of the control knob of the ganged potentiometers 13-1 etc. to any selected contact position brings such a set of weighted resistors individually into circuit with respective circuit branches 11, and, as previously indicated, each contact position switches in, by means of the weighted resistors connected thereat, a different set of factors corresponding to a different compound interest rate.

To use the apparatus, the applied proportions of the voltages $V_{0A}$, $V_{1A}$, $V_{2A}$ etc. are adjusted, by means of the potentiometers 10-0, 10-1, 10-2 etc. so that they are respectively analogues of the cash flows expected in the successive years of a project, and each of the switches 12 is individually set according to whether the cash sum represented by the particular voltage applied thereto is an inflow or an outflow. Then the ganged wiper arms of the rotary potentiometers 13-1 etc. are adjusted to find a set of contacts at which the reading of the instrument 15 is zero, or substantially zero. The state of the circuitry then is that the analogue currents from the circuit branches 11-0, 11-1 etc. that represent inflows at present worth are equal in sum to the sum of the analogue currents of opposite polarity representing outflows at present worth, which means that the percentage value represented by the setting of the control knob of the rotary potentiometers 13-1 etc. is the desired result, i.e. the anticipated percentage of return on the investment.

The preceding section of this specification has described the function of the calculator in carrying out step (c) only of the capital investment analysis. In that case the net cash flow for each year after tax is applied as a voltage, and only the A circuits of the calculator are employed.

When the calculator is used to carry out both steps (b) and (c), then cash flows before tax are applied as voltages. The various cash flows are segregated according to their bearing of tax liability. Those that immediately affect profit, either up or down, for the current accounting period are applied as voltages to the A circuits. The drawing visualises only one other set of auxiliary circuits, marked as the B circuits, but there could be more than one set of auxiliary circuits where the variegated method of taxation in any particular country necessitates this. It will be understood that the A and B circuits are both applying current analogue signals representing cash flows to be summed at the instrument 15 but the proportions of voltages $V_{0A}$ etc. applied to the A circuits represent the first group of cash flows that bear one type of tax liability, while the proportions of voltages $V_{0B}$ etc. applied to the B circuits represents a second group of cash flows that have a second and different tax liability.

The general operation of the calculator and the A circuits has already been described above. The auxiliary B circuits are similar in arrangement, purpose and function except that an additional rotary potentiometer 17 is connected to place a variable resistance across the meter 15 thereby to by-pass part of the summed analogue output current from the B circuits. The ohmic value of the by-pass resistance applied by the selector switch 17 must be varied according to the interest rate, and therefore the wiper arm of this switch is ganged with all the other selector switch wiper arms in the calculator. Thus only a part of the summed analogue output current from the B circuits passes through the centre-zero current indicating instrument 15. The output from circuits A and the output from circuits B (minus the current lost in the by-pass resistor) are summed in the instrument 15 in such a way that there is no electrical continuity between the circuits A and the circuits B. This is achieved by employing a meter which has two separate current coils acting on the same pointer. As before, the required answer is the percentage interest rate represented by the setting of the control knob of the potentiometers 13-1, 13-2 etc. and 17 when the instrument 15 reads zero current.

The required ohmic value of the by-pass resistance depends on the present worth of tax rebate on plant purchases, say, compared with the present worth of tax rebate on revenue expense. In other words, the potentiometer 17 multiplies the sum of the signals from the B circuits by an amount that represents the factor of difference between the tax liability of the B cash flows and that of the A cash flows. In view of the fact that this relationship will vary from time to time with changes in tax laws, the resistors 16 of the selector switch 17 are mounted in a plug-in holder so that when taxation changes occur one plug-in attachment can be replaced by another.

In order to provide greater circuit design flexibility, all present work factor resistors in the B circuits can be dropped by a chosen fixed ratio, say ⅓, from the ohmic values of the corresponding resistors in the A circuits, thus increasing the current flows to 1½ times the values obtaining in the circuits A under corresponding circumstances. The resistance values of the potentiometer 17 are then correspondingly chosen so as not only to introduce the differential taxation factor but also to nullify the factor introduced by the above dropping of the "present worth factor" resistance values.

It will be understood that various modifications of the particular circuitry described are possible without departing from the scope of the invention. Thus, whereas the voltage sources have been represented in simplified form as "batteries" the more usual arrangement would be for the apparatus to derive its voltages from supply circuitry designed for connection to an A.C. mains supply. Also, while D.C. analogue computation is illustrated, A.C. analogue circuits could be employed instead.

Furthermore, while the invention has been presented in its application to discounted cash flow problems, it will be understood that it is not limited to this but is applicable to other problems involving compound interest such as calculation of hire purchase rates. The parallel circuit branches need not represent years but could stand for months or any other desired periods of time.

What I claim is:

1. An electric analogue calculator comprising a succession of similar circuit branches representing different consecutive equal calendar periods of time and each including an impedance network and variable voltage source means applying across said impedance network an analogue potential commensurate with net cash inflow or outflow in respect of that time period, together with a polarity-reversing switch operable at will and determining the polarity or phase in which said analogue potential is applied to said impedance network according to whether it represents a cash inflow or a cash outflow, said impedance network in each circuit branch comprising in combination a fixed impedance and selectively adjustable impedance means said adjustable impedance means having different selectable impedance values in circuit and modifying the current in the respective circuit branch in accordance with a factor of present worth corresponding to a selected rate of interest and apropriate to said particular time period which the circuit represents thereby obtaining flowing in the respective circuit branch an analogue current signal commensurate with present worth of the net cash inflow or outflow in respect of that time period, the different selectively adjustable impedance means in the different circuit branches having impedance values differing from one another in that they introduce different factors of present worth determined appropriately to the individual different time periods which the different circuit branches represent, said circuit branches being connected in parallel to a common circuit wherein all the analogue current signals so obtained are summed, each of said selectively adjustable impedance means having various settings representative of different percentage rates of compound interest and all said adjustable impedance means being ganged together so that the same interest rate is simultaneously set in for each of the time period circuit branches.

2. A calculator according to claim 1, wherein the common circuit includes a current-indicating instrument having a current coil connected in series therein to indicate the sum of the analogue current signals.

3. A calculator according to claim 1, and comprising at least a second plurality of circuit branches similar to the aforesaid circuit branches and connected to a second common summing circuit which shares a common summing instrument with the first common summing circuit, said second common summing circuit comprising impedance means reducing the proportion of the sum of the analogue current signals in the second common summing circuit that is applied to the common summing instrument.

4. A calculator according to claim 3, wherein the common summing instrument is a current-indicating meter having two current coils acting on a common pointer and connected one into each of the two common summing circuits.

5. A calculator according to claim 3, wherein the means to reduce the proportion of the current signal sum applied from the second common summing circuit to the common summing instrument comprises a variable shunt resistor connected across the instrument which resistor has a wiper arm ganged together with the wiper arms of the variable resistors in the first and second pluralities of circuit branches.

6. A calculator according to claim 5, wherein the ohmic values of the resistors in the second plurality of circuit branches are proportionally reduced as compared with the values of the resistors in the first plurality of circuit branches.

7. A calculator according to claim 5, wherein the resistance of the variable resistor in the bypass are readily detachable as a unit.

References Cited

UNITED STATES PATENTS

| | | | |
|---|---|---|---|
| 2,508,410 | 5/1950 | Lunas | 324—76 |
| 2,630,968 | 3/1953 | Muskat | 235—184 |
| 3,406,281 | 10/1968 | Buchanan et al. | 235—184 X |

EUGENE G. BOTZ, Primary Examiner

F. D. GRUBER, Assistant Examiner

U.S. Cl. X.R.

235—180, 195, 197; 324—76, 114